United States Patent
Lopez et al.

(10) Patent No.: US 9,342,722 B1
(45) Date of Patent: May 17, 2016

(54) VERIFICATION OF AN ITEM

(71) Applicant: Lockheed Martin Corporation, Bethesda, MD (US)

(72) Inventors: David J. Lopez, Windermere, FL (US); Juan C. Fontana, Orlando, FL (US); David P. Summerlot, Orlando, FL (US); Joseph M. Turchiano, Orlando, FL (US); Matthew W. Kelley, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 42 days.

(21) Appl. No.: 14/510,793

(22) Filed: Oct. 9, 2014

(51) Int. Cl.
  *G07C 1/10* (2006.01)
  *G06K 7/10* (2006.01)
  *H04B 1/04* (2006.01)

(52) U.S. Cl.
  CPC .............. *G06K 7/10366* (2013.01); *G07C 1/10* (2013.01); *H04B 1/0483* (2013.01)

(58) Field of Classification Search
  CPC ........ G07C 1/10; G07C 1/20; G07C 2011/02; G07C 11/00; G07C 2011/04; G07C 3/00; G07C 9/00; G07C 9/00111; G07C 9/00309
  USPC .................................. 340/5.8–5.86
  See application file for complete search history.

(56) References Cited

U.S. PATENT DOCUMENTS

| | | | | |
|---|---|---|---|---|
| 7,002,472 | B2 * | 2/2006 | Stratmoen | G06Q 10/08 340/539.1 |
| 7,574,202 | B1 * | 8/2009 | Tsao | H04L 63/0272 370/310 |
| 8,127,151 | B2 | 2/2012 | Nelson et al. | |
| 2011/0090658 | A1 | 4/2011 | Adams et al. | |
| 2011/0120764 | A1 | 5/2011 | Kelley et al. | |
| 2012/0091456 | A1 | 4/2012 | Kelley et al. | |
| 2015/0140932 | A1 * | 5/2015 | Chien | H04W 76/021 455/41.2 |

FOREIGN PATENT DOCUMENTS

WO    2012142287 A2    10/2012

* cited by examiner

*Primary Examiner* — Allen T Cao
(74) *Attorney, Agent, or Firm* — Withrow & Terranova, PLLC

(57) ABSTRACT

Mechanisms for verification of an item. A controller reads out signals from an antenna array comprising a plurality of individual antenna elements that is configured to overlay an item that generates radio frequency (RF) emissions. The signals quantify the RF emissions received by antenna elements from the item. The controller generates an ad hoc RF emission signature based on the signals. A predetermined RF emission signature associated with the item is accessed. The ad hoc RF emission signature and the predetermined RF emission signature are compared to determine a verification status, and the controller performs a verification action based on the verification status.

20 Claims, 13 Drawing Sheets

VERIFICATION OF AN ITEM

TECHNICAL FIELD

The embodiments relate generally to verification of an item.

BACKGROUND

It is often desirable to ensure that an item is authentic, and/or has not been altered from its original condition. Many authentication techniques are, however, relatively easily counterfeited, or otherwise circumvented. The consequences of some items being unknowingly altered, such as an electronic chipset, may be particularly problematic, resulting in insecure communications, undesirable functionality, or worse. However, it may be impracticable, or even impossible, to determine the authenticity or verify the integrity of an electronic chipset prior to initiating the electronic chipset or in the absence of destructively analyzing the electronic chipset.

SUMMARY

The present embodiments relate to verification of an item, such as, by way of non-limiting example, an electronic chipset. In one embodiment, a controller reads out signals from an antenna array comprising a plurality of individual antenna elements that is configured to overlay an item that generates radio frequency (RF) emissions. The signals quantify the RF emissions received by the antenna elements from the item. The controller generates an ad hoc RF emission signature based on the signals. A predetermined RF emission signature associated with the item is accessed. The ad hoc RF emission signature and the predetermined RF emission signature are compared to determine a verification status, and the controller performs a verification action based on the verification status.

In another embodiment, a method for verifying an item is provided. The method includes accessing predetermined memory chip information that identifies information associated with a plurality of memory chips embedded in a conformal coating to form a predetermined verification token. A memory chip data acquisition phase is performed to obtain real-time memory chip information from the plurality of memory chips to form a real-time verification token. A verification action is then performed based on a comparison between the predetermined verification token and the real-time verification token.

In one embodiment, the predetermined memory chip information may comprise a memory chip quantity value that identifies a total number of the plurality of memory chips. In such embodiment, the predetermined verification token may simply be the memory chip quantity value. The memory chip data acquisition phase includes initiating requests to the plurality of memory chips. Real-time memory chip information comprising a response from at least some of the plurality of memory chips is received. The verification action is based on determining whether a response was received from a number of memory chips equal to the memory chip quantity value. If the number of responses received is equal to the memory chip quantity value, then the verification action may comprise a signal indicating that verification was successful. If the number of responses received is not equal to the memory chip quantity value, then the verification action may comprise a signal indicating that verification was unsuccessful.

In another embodiment, the predetermined memory chip information comprises a list of predetermined identifiers, each predetermined identifier corresponding to a memory chip of the plurality of memory chips. In such embodiment, the predetermined verification token comprises the aggregate, or concatenation, of the known predetermined identifiers. The memory chip data acquisition phase includes initiating requests to the plurality of memory chips, and receiving real-time memory chip information comprising a chip identifier from at least some of the plurality of memory chips. The received chip identifiers are then aggregated, or concatenated, to form the real-time verification token. The verification action is based on the predetermined memory chip information and the real-time memory chip information obtained from the plurality of memory chips. The predetermined memory chip information comprising the list of predetermined identifiers is accessed to form the predetermined verification token. If a chip identifier that corresponds to each predetermined identifier on the list of predetermined identifiers is received from the plurality of memory chips, then the predetermined verification token will match the real-time verification token, and the verification action may comprise a signal indicating that verification was successful. If a chip identifier that corresponds to each predetermined identifier on the list of predetermined identifiers is not received from the plurality of memory chips, then the predetermined verification token will not match the real-time verification token, and the verification action may comprise a signal indicating that verification was unsuccessful.

In one embodiment, the memory chip data acquisition phase and the verification action are performed during an initialization phase of a processor. In some embodiments, the memory chip data acquisition phase and the verification action are also performed periodically during operation of the processor.

In another embodiment, a system is provided. The system includes a conformal coating conformable to a substrate, and a plurality of memory chips. Each memory chip is configured to establish a communication link with a controller and provide real-time memory chip information in response to a request from the controller, and is embeddable in the conformal coating. In one embodiment, the system includes the controller. The controller is configured to access predetermined memory chip information, and perform a memory chip data acquisition phase to obtain real-time memory chip information from the plurality of memory chips.

In another embodiment, a method of adding a verification mechanism to a processor on a substrate is provided. The method includes integrating a controller to communicate with the processor, the controller being communicatively coupled to a plurality of memory chips. The controller is configured to access predetermined memory chip information to form a predetermined verification token, perform a memory chip data acquisition phase to obtain real-time memory chip information from a plurality of memory chips to form a real-time verification token, and perform a verification action based on a comparison between the predetermined verification token and the real-time verification token. A conformal coating is applied to at least a portion of the substrate to thereby embed the plurality of memory chips in the conformal coating. The conformal coating is then cured.

In another embodiment, a controller reads out signals from an antenna array comprising a plurality of individual antenna elements that is configured to overlay an item that generates radio frequency (RF) emissions. The signals quantify the RF emissions received by the antenna elements from the item. The controller generates an ad hoc RF emission signature based on the signals. A predetermined RF emission signature associated with the item is accessed. The ad hoc RF emission signature and the predetermined RF emission signature are compared to determine a verification status, and the controller performs a verification action based on the verification status.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first memory chip" and "second memory chip," and does not imply a priority, a type, an importance, or other attribute, unless otherwise stated herein.

The present embodiments relate to verification of an item. Although for purposes of illustration the embodiments are discussed in the context of the verification of an electronic chipset, the embodiments are not limited to verification of an electronic chipset and have applicability in any context in which an item may be coupled to a controller that in turn communicates with a plurality of memory chips embedded in a conformal coating.

Figure 1:
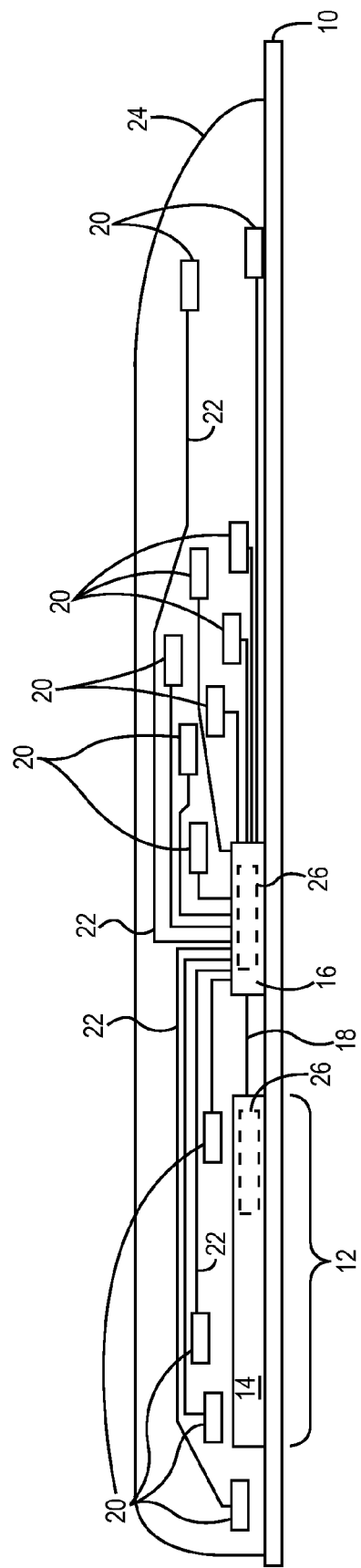
FIG. 1 is a block diagram according to one embodiment.

FIG. 1 is a block diagram according to one embodiment. A substrate, in this example a printed circuit board (PCB) 10 includes a chipset 12. The chipset 12 is illustrated with a single chip, in this example a processor 14, but in other embodiments the chipset 12 could include any number of chips. The processor 14 may be a processor with any desired functionality, such as, by way of non-limiting example, a general purpose processor in a desktop computer or smartphone, or in other contexts, a processor used to guide, for example, a missile to a target.

The processor 14 is communicatively coupled to a reader chip 16, in one embodiment, via a wired conductive path 18. The conductive path 18 may comprise any suitable metallic path that facilitates signal propagation. The conductive path 18 may be generated in any desirable manner, including, for example, via additive manufacturing techniques. The reader chip 16 is communicatively coupled to a plurality of memory chips 20. For purposes of illustration the memory chips 20 are not depicted to scale, and the memory chips 20 may be minute, such that the memory chips 20 are difficult to discern with the human eye. While only thirteen memory chips 20 are illustrated in FIG. 1, the embodiments are not limited to any number of memory chips 20, and hundreds or thousands of memory chips 20 may be utilized in accordance with the embodiments discussed herein. In some embodiments, the memory chips 20 comprise radio-frequency identification (RFID) memory chips. Suitable RFID memory chips, for example, are Higgs® 3 RFID memory chips, available from Alien Technologies, 18220 Butterfield Blvd., Morgan Hill, Calif. 95037 USA, although the embodiments are not limited to any particular type of RFID memory chip, or indeed, to RFID memory chips, and have applicability to any type of memory chip providing the functionality described herein.

In one embodiment, the memory chips 20 are communicatively coupled to the reader chip 16 via wired conductive paths 22, only several of which are individually labeled in FIG. 1. The memory chips 20, and in this example, the chipset 12 and reader chip 16, are all embedded in a cured conformal coating 24.

A controller 26 may be integrated with the reader chip 16 or the processor 14. The controller 26 may comprise individual circuitry, such as a field-programmable gate array or application-specific integrated circuit, or may comprise complex software instructions that execute on the processor 14, or execute on a processor in the reader chip 16 (not illustrated). The controller 26 can communicate with the memory chips 20, and is thus communicatively coupled to the memory chips 20.

Figure 2:
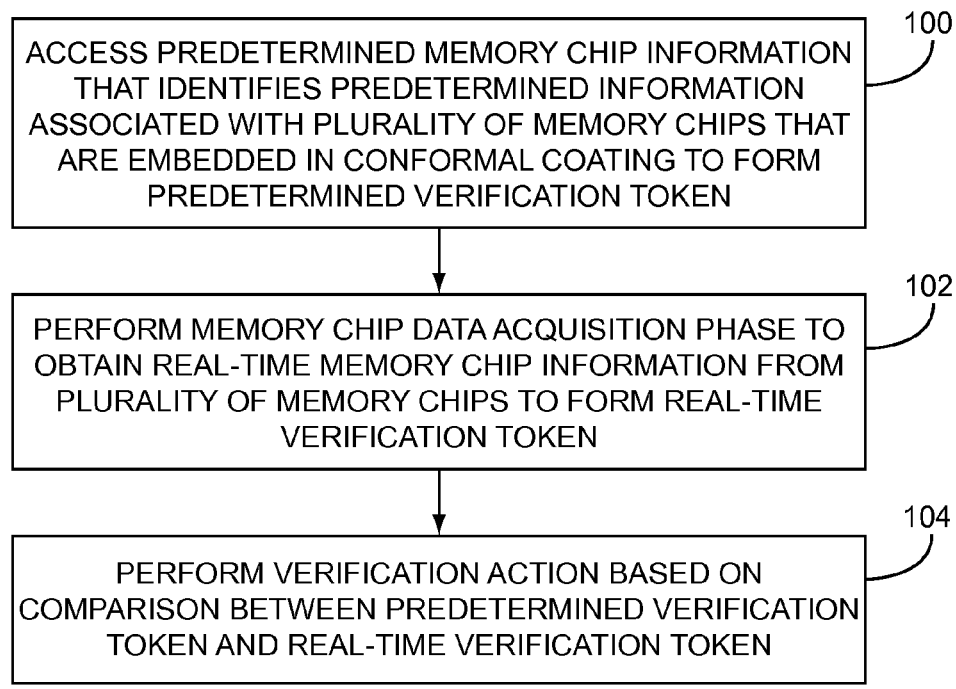
FIG. 2 is a flowchart of a method for verification of an item according to one embodiment.

FIG. 2 is a flowchart of a method for verification of an item according to one embodiment, and will be discussed in conjunction with FIG. 1. Referring first to FIG. 2, the controller 26 accesses predetermined memory chip information that identifies predetermined information associated with the memory chips 20 that are embedded in the conformal coating 24 to form a predetermined verification token (FIG. 2, block 100). As will be discussed in greater detail herein, the predetermined memory chip information may comprise any information that can be used to verify that the memory chips 20 are, either directly or indirectly, communicatively coupled to the controller 26. The conformal coating 24 may comprise any suitable coating in which the memory chips 20 may be embedded, and which will conform to the surface of components, such as the PCB 10 and the chipset 12. In one embodiment the conformal coating 24 is opaque, such that visible inspection would not reveal the existence of the memory chips 20. One suitable conformal coating 24 comprises the CF6-2 resin system available from Epoxy Technology, Inc., 14 Fortune Drive, Billerica, Mass. 01821.

The controller 26 performs a memory chip data acquisition phase to obtain real-time memory chip information from the plurality of memory chips 20 and forms a real-time verification token (FIG. 2, block 102). The controller 26 then performs a verification action based on a comparison between the predetermined verification token and the real-time verification token (FIG. 2, block 104). The verification action may comprise any suitable action based on the comparison between the predetermined verification token and the real-time verification token. For example, if the predetermined verification token and the real-time verification token did not match, or otherwise failed verification, then the controller 26 may communicate a failed verification signal to the processor 14. The processor 14 may then immediately halt further processing, send an alert, or perform any other desired functionality. Alternatively, the controller 26 itself may directly halt the processor 14, or perform any other desired functionality. If the predetermined verification token and the real-time verification token did match, or otherwise passed verification, then the controller 26 may communicate a passed verification signal to the processor 14. The processor 14 may continue normal processing, or perform any other desired functionality. The memory chip data acquisition phase and the verification action may be performed during, for example, an initialization stage of the processor 14. The memory chip data acquisition phase and the verification action may, in some embodiments, also be performed periodically during operation of the processor 14.

Among other advantages, the embodiments greatly reduce a likelihood that an individual can successfully breach the conformal coating 24 in an attempt to gain direct access to the chipset 12 without severing one of the wired conductive paths 22. Severing one of the wired conductive paths 22 would inhibit communication between the corresponding memory chip 20 and the controller 26, and ensure that the controller 26 determines that verification failed. For example, assume that one thousand minute memory chips 20 are substantially randomly distributed throughout the conformal coating 24, such that some of the memory chips 20 are nearer to the surface of the PCB 10, others are nearer to the top of the surface of the conformal coating 24, and some of the memory chips 20 may be adhered directly to the surface of the PCB 10. Any attempt to breach the conformal coating 24 would likely result in the destruction of at least one wired conductive path 22, and result in a verification failure. Thus, in some embodiments, the status of the integrity of the PCB 10 can be determined based on the verification action. If the verification failed, it may be determined that the integrity of the PCB 10 has been compromised.

It should be noted that the embodiments are not limited to intentional attempts to breach the conformal coating 24, but are applicable to any action that may result in damage to the conformal coating 24, such as shipping, operation in an environment in which the chipset 12 is not warranted, and the like.

Figure 3:
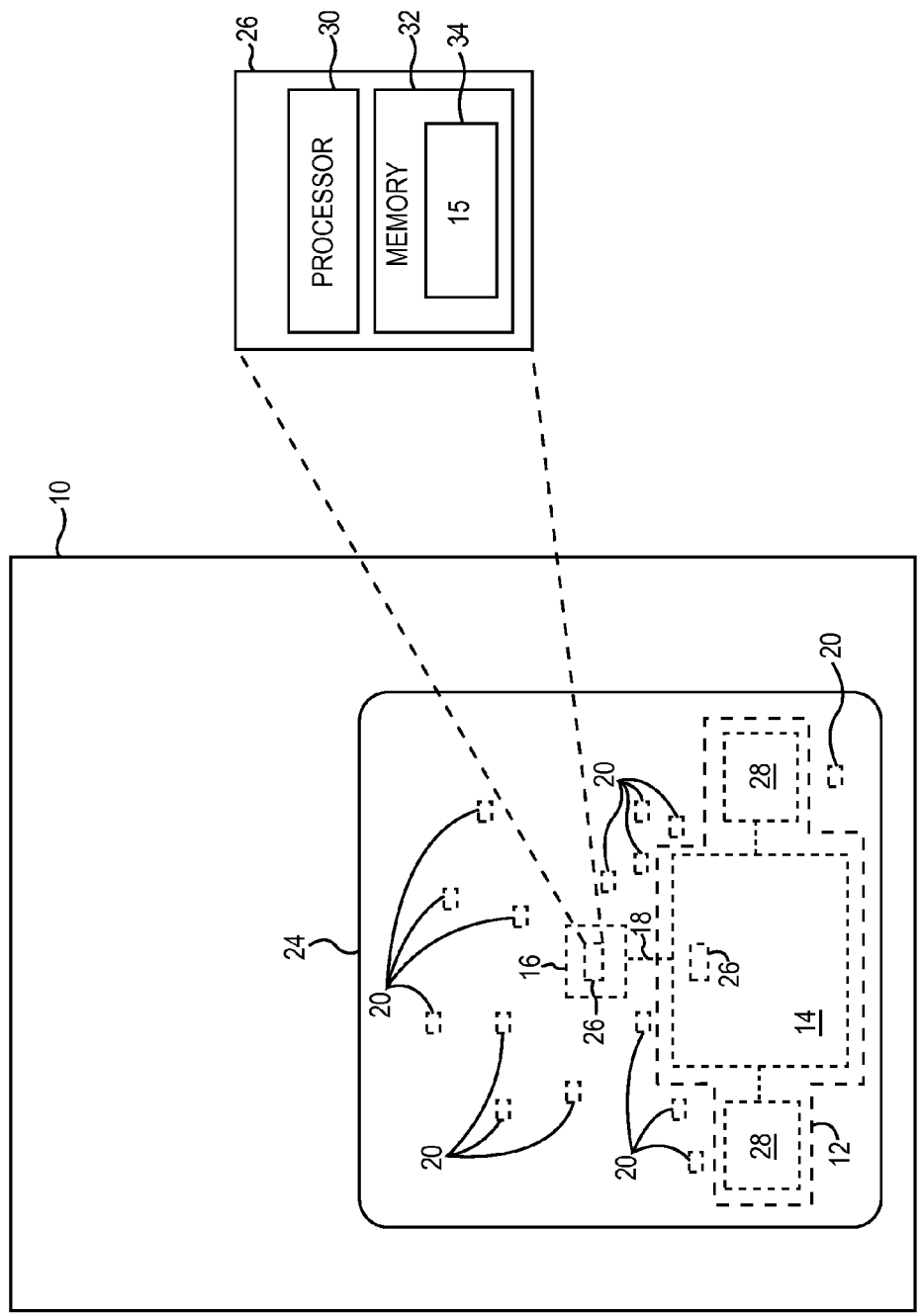
FIG. 3 is a top view block diagram according to another embodiment.

FIG. 3 is a top view block diagram according to another embodiment. In this embodiment the communication links between the plurality of memory chips 20 and the controller 26 are wireless communication links. The chipset 12 comprises the processor 14 and two communicatively coupled chips 28. The controller 26 comprises a processor 30 and a memory 32. The processor 30 may be the same processor as the processor 14 if the controller 26 is integrated into the processor 14, and the memory 32 similarly may comprise a memory device integrated with the processor 14.

Figure 4:
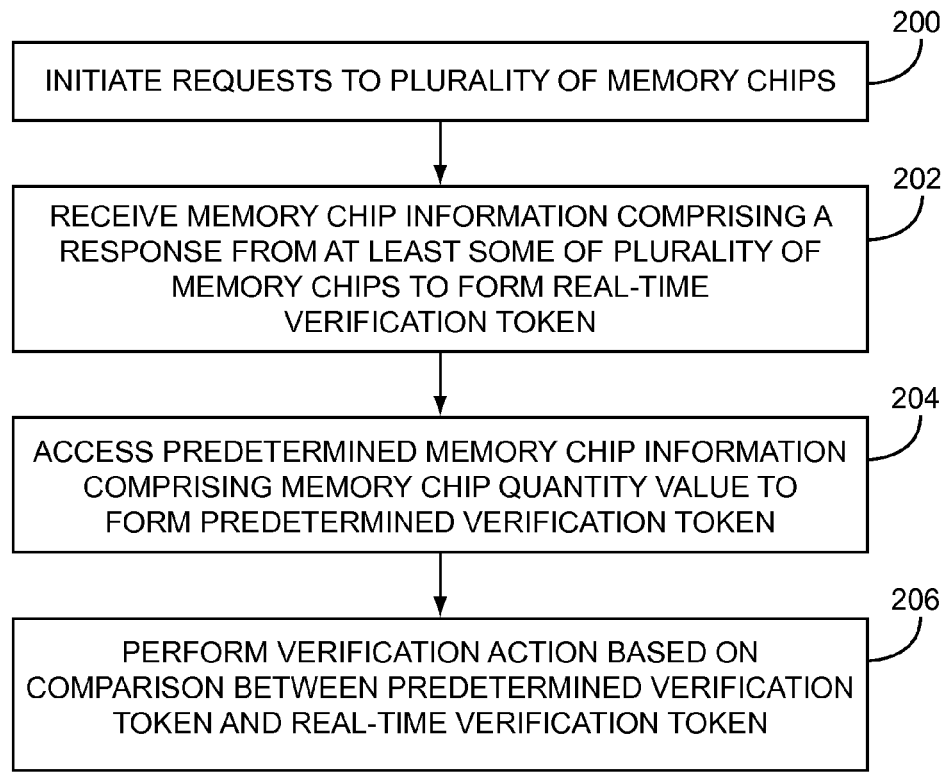
FIG. 4 is a flowchart of the method for verification of an item discussed above with regard to FIG. 2, wherein the predetermined memory chip information comprises a memory chip quantity value.

FIG. 4 is a flowchart of the method for verification of an item discussed above with regard to FIG. 2, wherein the predetermined memory chip information comprises a memory chip quantity value. FIG. 4 will be discussed in conjunction with FIG. 3. Referring first to FIG. 4, the controller 26 initiates requests to the plurality of memory chips 20 (FIG. 4, block 200). In one embodiment, initiating the requests may comprise initiating a broadcast request to all the memory chips 20 concurrently. If done wirelessly, each memory chip 20 may be configured to receive a request from the controller 26 on a certain frequency. In other embodiments, the controller 26 may initiate a separate request to each memory chip 20.

While initiating the requests may be physically implemented by the reader chip 16, or, as discussed below, the receipt of responses from the memory chips 20 may be physically implemented by the reader chip 16, because such functionality is under the control of the controller 26, such functionality may be attributed herein to the controller 26.

The controller 26 receives real-time memory chip information that comprises a response from at least some of the memory chips 20 and forms a real-time verification token (FIG. 4, block 202). In this embodiment, responses may simply comprise an acknowledgement or other response that indicates the respective memory chip 20 received the request, and the real-time verification token may comprise the number of responses received. The controller 26 accesses the memory 32 to obtain the predetermined memory chip information, which in this embodiment, comprises a memory chip quantity value 34 that identifies the total number of the memory chips 20 to form a predetermined verification token (FIG. 4, block 204). In this embodiment, the predetermined verification token may comprise the memory chip quantity value, The controller 26 determines whether the predetermined verification token matches the real-time verification token, i.e., whether the number of responses received from the memory chips 20 is equal to the memory chip quantity value 34. The controller 26 then performs a verification action based on the comparison between the predetermined verification token and the real-time verification token (FIG. 4, block 206). For example, if the number of responses received from the memory chips 20 is equal to the memory chip quantity value 34, the controller 26 may send the processor 14 a verification passed message, or, the verification action may be to do nothing. If the number of responses received from the memory chips 20 is not equal to the memory chip quantity value 34, the controller 26 may send the processor 14 a verification failed message, or, by way of non-limiting example, shut down further processing of the chipset 12.

Figure 5:
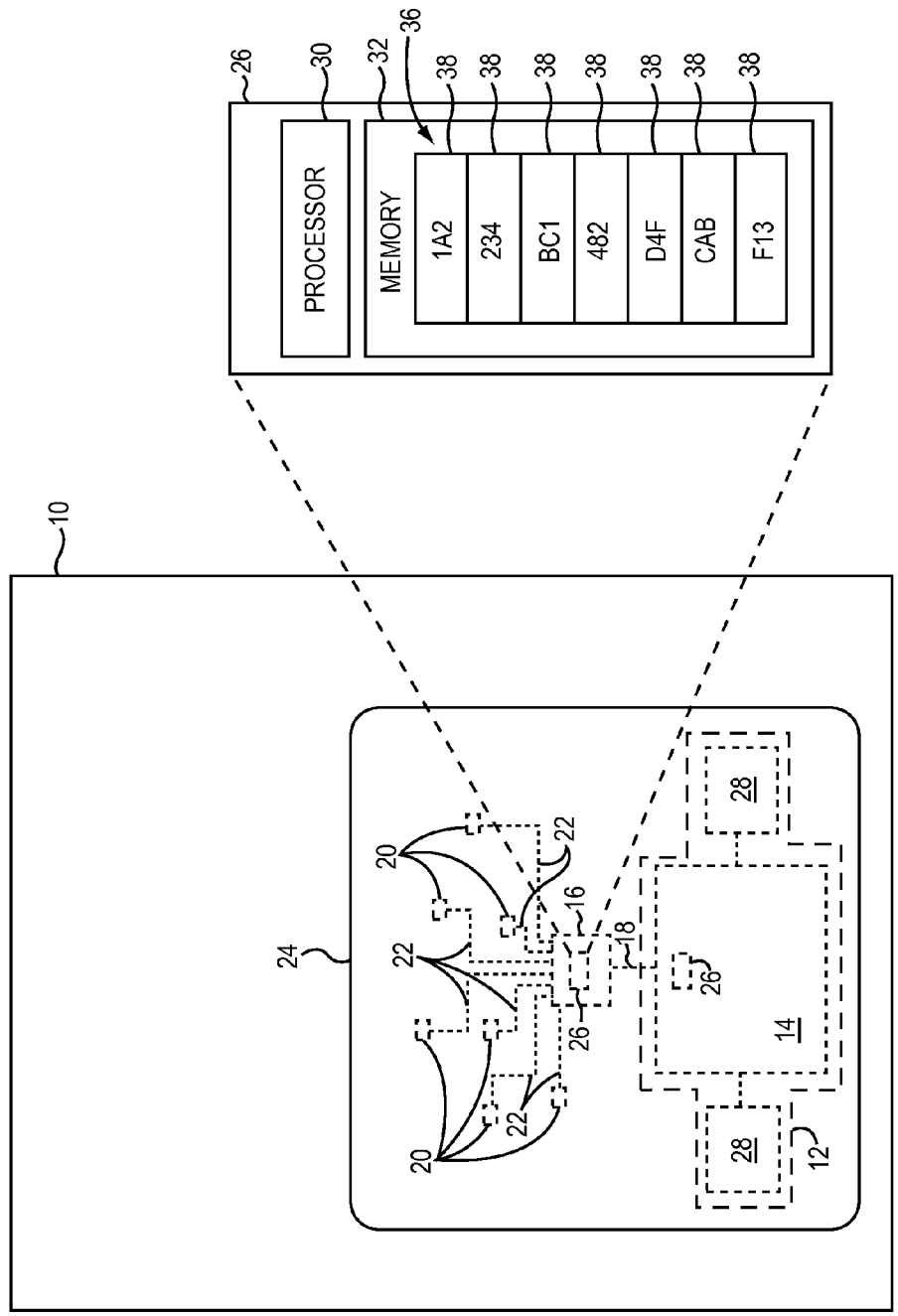
FIG. 5 is a top view block diagram according to another embodiment.

FIG. 5 is a top view block diagram according to another embodiment. In this embodiment, the communication links between the memory chips 20 and the controller 26 are wired conductive paths 22. The chipset 12 comprises the processor 14 and the two communicatively coupled chips 28. The controller 26 comprises the processor 30 and the memory 32. As discussed above, the processor 30 may be the same processor as the processor 14 if the controller 26 is integrated into the processor 14, and the memory 32 similarly may comprise a memory device integrated with the processor 14.

Figure 6:
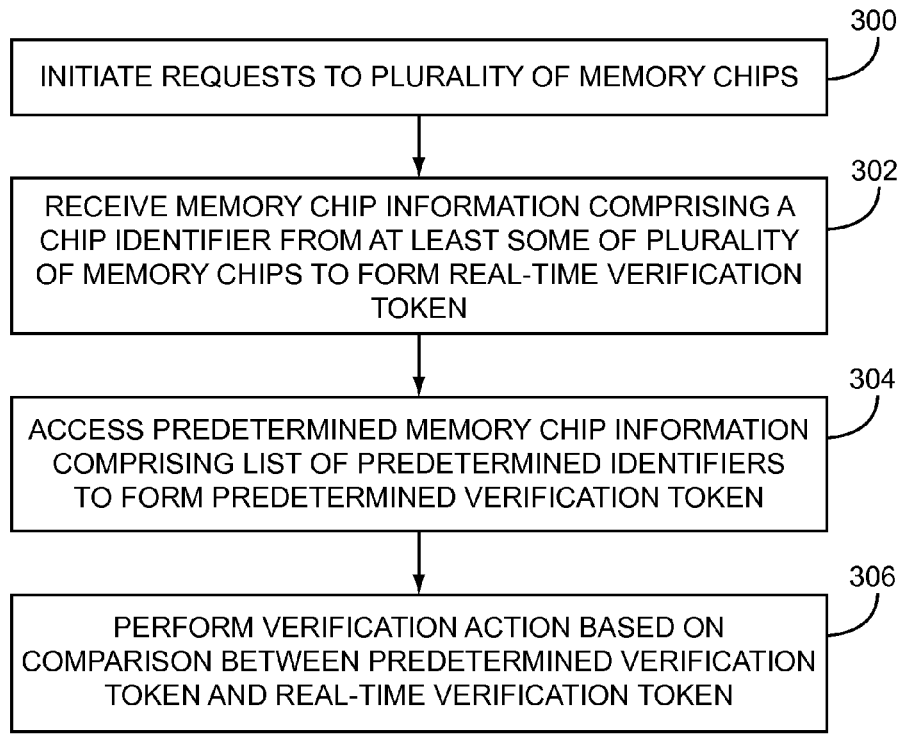
FIG. 6 is a flowchart of the method for verification of an item discussed above with regard to FIG. 2, wherein the predetermined memory chip information comprises a list of predetermined identifiers.

FIG. 6 is a flowchart of the method for verification of an item discussed above with regard to FIG. 2, wherein the predetermined memory chip information comprises a list of predetermined identifiers. FIG. 6 will be discussed in conjunction with FIG. 5. Referring first to FIG. 6, the controller 26 initiates requests to the memory chips 20 (FIG. 6, block 300). As discussed above, initiating the requests may comprise initiating a broadcast request to all the memory chips 20 concurrently, or, in other embodiments, the controller 26 may initiate a separate request to each memory chip 20.

The controller 26 receives real-time memory chip information that comprises a chip identifier from at least some of the plurality of memory chips 20 and forms a real-time verification token (FIG. 6, block 302). Thus, in this embodiment, upon receipt of the request from the controller 26, each memory chip 20 responds with real-time memory chip information that comprises a chip identifier associated with the respective memory chip 20. In this embodiment, the real-time verification token may be generated based on any suitable function or algorithm for processing the received chip identifiers. In some embodiments, the real-time verification token may be a concatenation of each chip identifier. The controller 26 accesses the memory 32 to obtain the predetermined memory chip information, which in this embodiment, comprises a list 36 of predetermined memory chip identifiers 38 to form a predetermined verification token (FIG. 6, block 304). In some embodiments, the predetermined memory chip identifiers 38 may be encrypted, and the algorithm used to encrypt the predetermined memory chip identifiers 38 may be applied to the chip identifiers received from the memory chips 20, to add an additional level of security.

The controller 26 then performs a verification action based on a comparison between the predetermined verification token and the real-time verification token (FIG. 6, block 306). For example, if a chip identifier corresponding to each of the predetermined memory chip identifiers 38 is received, the controller 26 may send the processor 14 a verification passed message, or, the verification action may be to do nothing. If a chip identifier corresponding to each of the predetermined memory chip identifiers 38 is not received, the controller 26 may send the processor 14 a verification failed message, or, by way of non-limiting example, shut down further processing of the chipset 12.

Figure 7:
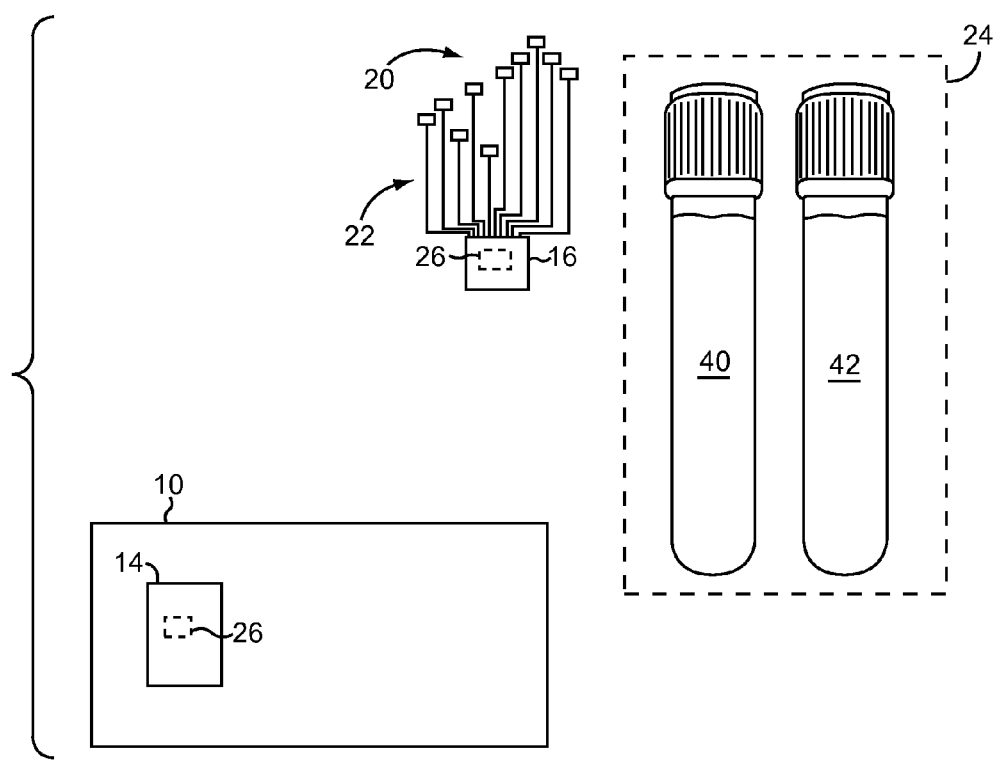
FIG. 7 is a block diagram of a system for adding a verification mechanism to a processor on a substrate according to one embodiment.

FIG. 7 is a block diagram of a system for adding a verification mechanism to a processor on a substrate according to one embodiment.

Figure 8:
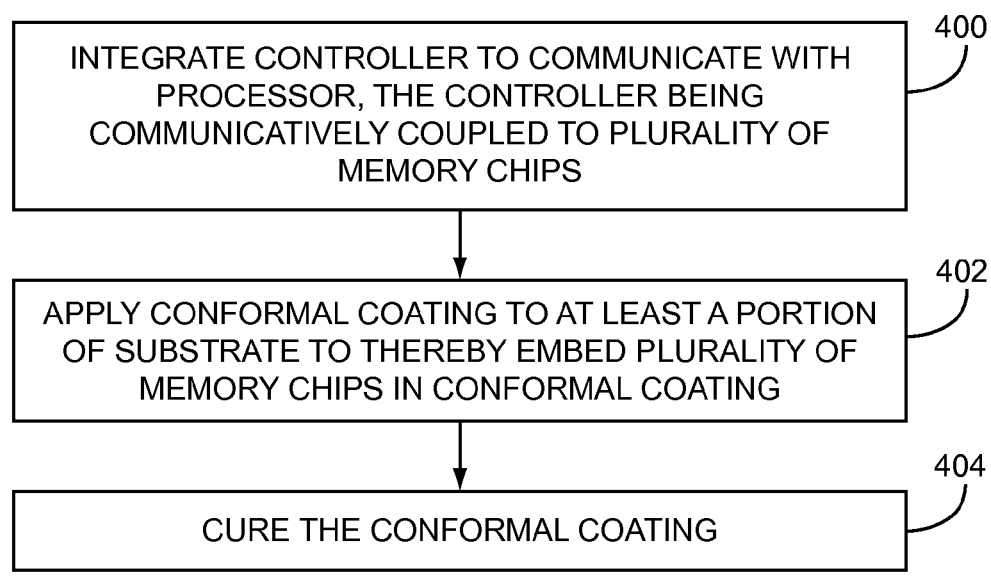
FIG. 8 is a flowchart of a method of adding a verification mechanism to a processor on a substrate according to one embodiment.

FIG. 8 is a flowchart of a method of adding a verification mechanism to a processor on a substrate according to one embodiment, and will be discussed in conjunction with FIG. 7. The process begins with the processor 14 fixed with respect to a substrate, such as the PCB 10. The processor 14 may be coupled to the PCB 10 in any desirable manner. The controller 26 is then integrated to communicate with the processor 14 (FIG. 8, block 400). The controller 26 may be integrated with the reader chip 16, or may comprise suitable software instructions that are programmed to execute on the processor 14 and control the reader chip 16 via a communication path (not illustrated) between the processor 14 and the reader chip 16. The controller 26 is communicatively coupled to a plurality of memory chips 20. In one embodiment, the memory chips 20 may be provided pre-wired to the reader chip 16, such that reader chip 16 is then wired to the processor 14, facilitating communication between the controller 26 and the memory chips 20.

The controller 26 is configured to access predetermined memory chip information, perform a memory chip data acquisition phase to obtain real-time memory chip information from the plurality of memory chips 20, and perform a verification action based on the predetermined memory chip information and the real-time memory chip information obtained from the plurality of memory chips 20, as discussed above.

A conformal coating 24 is then applied to at least a portion of the PCB 10 to thereby embed the plurality of memory chips 20 in the conformal coating 24 (FIG. 8, block 402). In one embodiment, the conformal coating 24 may comprise, prior to being cured, a plurality of liquids which may be mixed together prior to application, such as a resin 40 and a hardener 42. The resin 40 and the hardener 42 may be mixed together and then applied to the PCB 10 to cover the processor 14, reader chip 16 and memory chips 20, preferably in a relatively thick coating. In some embodiments the application process may promote randomness of the locations of the memory chips 20, and the memory chips 20 are thereby randomly distributed throughout the conformal coating 24 after curing. As discussed above, the memory chips 20 may also be located at different depths of the conformal coating 24. This may be facilitated in part by ensuring that the conformal coating 24 has a sufficient viscosity such that the memory chips 20 do not all sink to the surface of the PCB 10. In some embodiments, additional unconnected memory chips 20 may be included in the conformal coating 24 to confuse and/or further inhibit a breach of the conformal coating 24 by an individual. After application of the conformal coating 24, the conformal coating 24 is cured (FIG. 8, block 404).

The embodiments have wide applicability to verification of any type of item that can be coupled to electronic circuitry. The embodiments may also be manufactured relatively inexpensively, and thus may have utility in a wide range of applications, from military uses to relatively low cost electronic devices. Among other advantages, the embodiments make it impracticable, or impossible, to intentionally or inadvertently breach the conformal coating 24 without detection. While for purposes of illustration the embodiments have been described in conjunction with components and circuit boards, the embodiments are not so limited. In other embodiments, the integrity of structural members in walls, bridges, aircraft structures, and the like may be verified. In still other embodiments, the integrity of any surface that can be coated with the conformal coating may be verified, such as the use thereof to detect cracks, stress, strain, and the like. In other embodiments, antennas and/or inlays may be incorporated into the conformal coating and coupled to one or more memory chips, and could wirelessly detect changes in stress, coating modifications, and the like. In some embodiments, the resonant frequency of the antenna and/or inlays may change as a result of structural stress or coating modification. In some embodiments, this could be used for failure prediction in structures.

Figure 9:
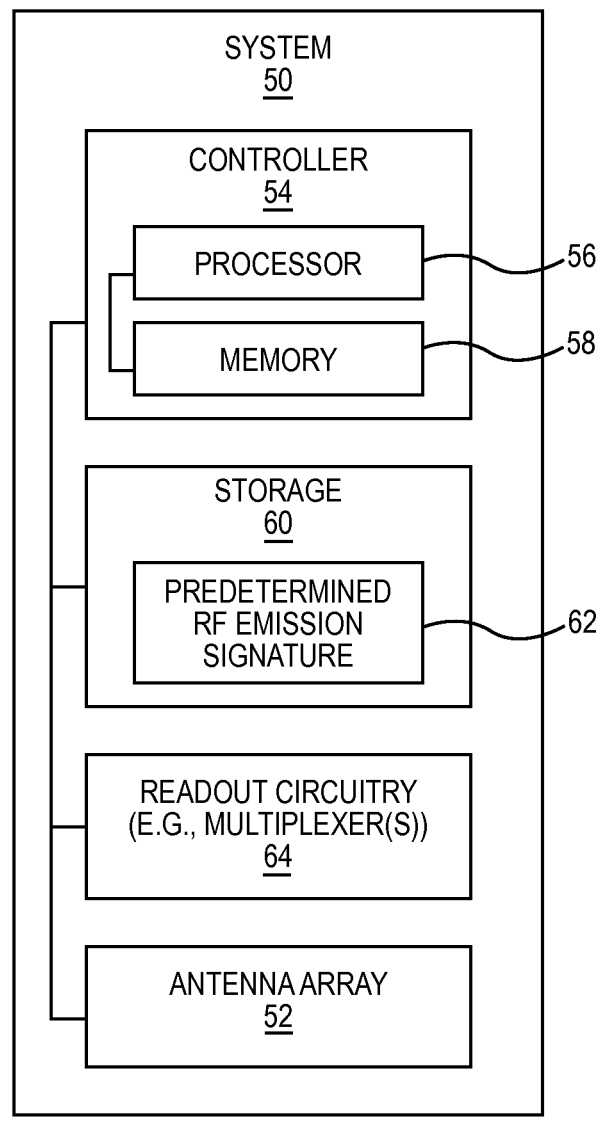
FIG. 9 is a block diagram of a system according to another embodiment.

FIG. 9 is a block diagram of a system 50 according to another embodiment. In this embodiment, an antenna array 52 overlays an item (not illustrated) that, in operation, emits radio frequency (RF) energy. The item may comprise, by way of non-limiting example, circuitry, a printed circuit board comprising one or more electronic components, or any other electronic device. The antenna array 52 includes a plurality of antenna elements, each of which can quantify the RF emissions received by the antenna elements. The system 50 includes a controller 54 that includes a processor 56 and a memory 58. The system 50 includes a storage 60 that may include, as described in greater detail herein, one or more predetermined RF emission signatures 62 that are associated with the respective item that is overlayed by the antenna array 52. The system 50 may also include readout circuitry 64 that is configured to readout the individual antenna elements of the antenna array 52. The particular readout circuitry 64 may differ depending on the design of the antenna array 52, but in one embodiment, the readout circuitry 64 comprises one or more multiplexers that are configured to readout successive antenna elements of the antenna array 52 in a relatively short period of time.

The antenna array 52 is overlayed on the item to be authenticated. The antenna array 52 may be overlayed, for example, by embedding the antenna array 52 in a conformal coating that is applied to and which adheres to the item. The antenna array 52 may be relatively thin, such as less than one millimeter thick and may be flexible, such that the antenna array 52 may substantially conform to the item when embedded in the conformal coating. Alternatively, the antenna array 52 may be overlayed on the item by being positioned in close proximity to the item. In one embodiment, for example, the antenna array 52 may be affixed to a cover that covers the item, and places the antenna array 52 in close proximity to the item.

In practice, a predetermined RF emission signature 62 for the item is first generated. The predetermined RF emission signature 62 is generated by reading out the antenna array 52 via the readout circuitry 64. In particular, the controller 54 may include an initialization mode wherein the controller 54 accesses the storage 60 and determines that the storage 60 does not contain a predetermined RF emission signature 62. This may occur, for example, the first time the item is powered on. The controller 54 may read out, via the readout circuitry 64, signals from the antenna array 52 that quantify the RF emissions received by the antenna elements from the item. Based on the signals, the controller 54 may generate the predetermined RF emission signature 62. The generation of the predetermined RF emission signature 62 may be based on any desired algorithm or methodology. In one embodiment, the predetermined RF emission signature 62 comprises a plurality of antenna element values, wherein each antenna element value corresponds to one of the antenna elements, and quantifies the RF emissions received by the antenna elements when readout by the controller 54. However, the embodiments are not limited to any particular format for the predetermined RF emission signature 62, and any algorithm for quantifying the RF emissions received by the antenna elements of the antenna array 52 may be used. The RF emissions may be quantified in any desired manner, such as by voltage or current.

The process above may be performed once, or, when in the initialization mode, the controller 54 may cause the generation of multiple predetermined RF emission signatures 62, and then average the multiple predetermined RF emission signatures 62, or otherwise combine the multiple predetermined RF emission signatures 62, to generate a single predetermined RF emission signature 62, for subsequent use.

After the predetermined RF emission signature 62 is generated, the controller 54, may subsequently readout, via the readout circuitry 64, the antenna array 52, to generate an ad hoc RF emission signature. The ad hoc RF emission signature is then compared to the predetermined RF emission signature 62 to determine a verification status of the item. If the ad hoc RF emission signature matches the predetermined RF emission signature 62, then the verification status is determined to be a successful verification status. If the ad hoc RF emission signature does not match the predetermined RF emission signature 62, then the verification status is determined to be an unsuccessful verification status. The controller 54 may then perform a verification action based on the verification status.

By way of non-limiting example, if the verification status is a successful verification status, the controller 54 may provide an output signal to another component (not illustrated) that indicates successful verification, or, the verification action may be to allow the item to continue processing uninterrupted. Alternatively, if the verification status is an unsuccessful verification status, the controller 54 may provide an output signal to another component (not illustrated) that indicates unsuccessful verification, or, the verification action may be to immediately halt subsequent execution of the item. Matching may comprise, for example, substantially identically RF emissions signatures, or may permit a small deviation in differences, such as less than 5% or 10%. For example, if the predetermined RF emission signature 62 comprises a plurality of individual values that correspond to individual antenna elements of the antenna array 52, such individual values may deviate by 5%, for example, from corresponding values in the ad hoc RF emission signature, and still be considered a match.

The controller 54 may perform the described verification status at a particular stage of the execution of the item, and/or periodically while the item is executing. For example, the system 50 may be executed each time the item is powered on to determine whether the antenna array 52 has been breached or otherwise modified since the generation of the predetermined RF emission signature 62. Thereafter, so long as the item continues to be powered the system 50 may be executed periodically, or at random times, to ensure that the antenna array 52 has not been breached while the item is executing.

Figure 10:
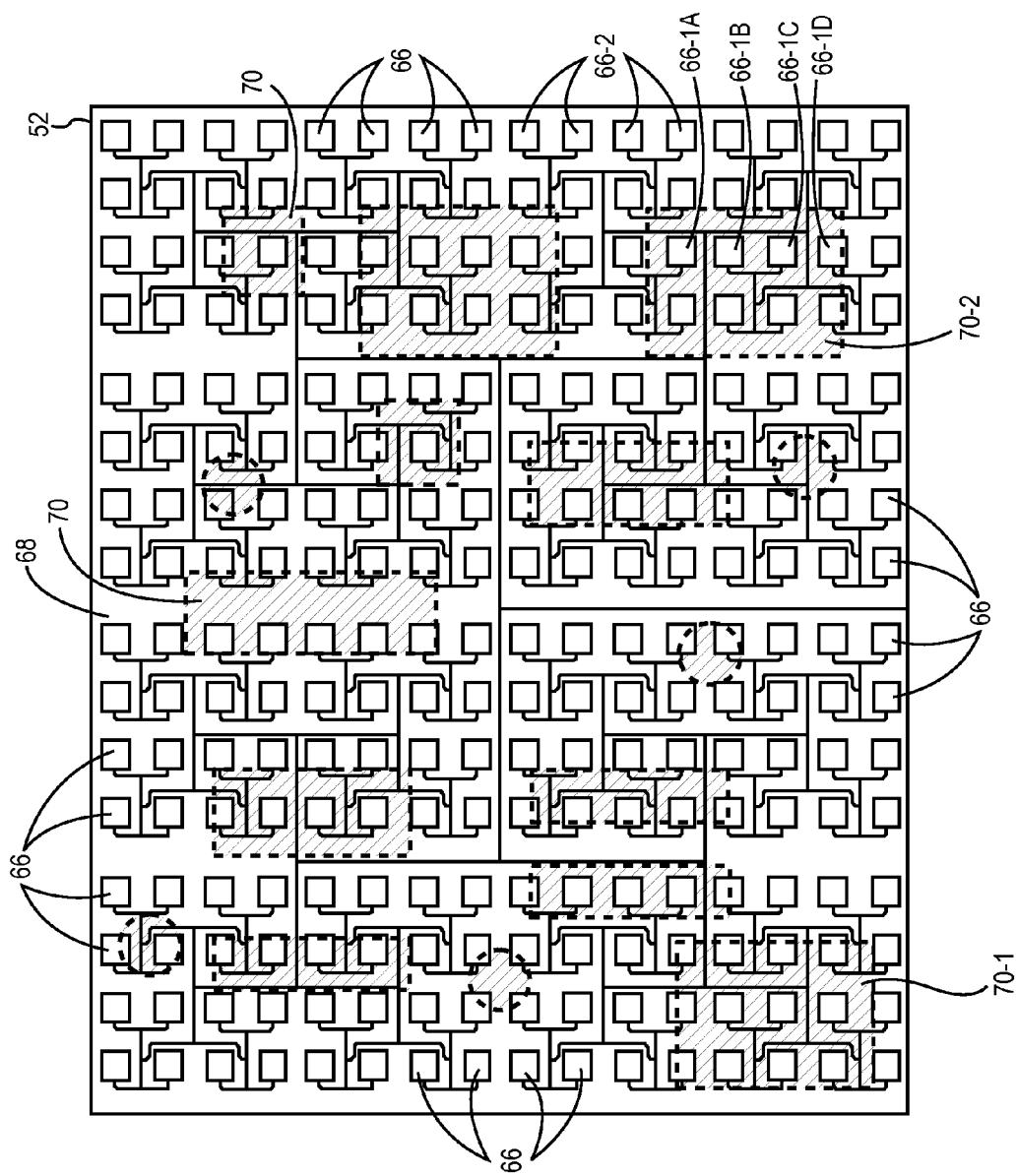
FIG. 10 is a top view of an antenna array according to one embodiment.

FIG. 10 is a top view of the antenna array 52 according to one embodiment. The antenna array 52 comprises a plurality of antenna elements 66 that overlay an item 68. In this example the antenna array 52 comprises 256 antenna elements 66 (only some of which are individually labelled as antenna element 66). However, the embodiments are not limited to any particular number of antenna elements 66. The item 68, in this example, comprises a printed circuit board. The item 68 comprises a plurality of components 70, 70-1, 70-2 (generally, components 70) that are in close proximity to the antenna array 52. The other components of the system 50, such as the controller 54, storage 60, and readout circuitry 64 may be physically located on the item 68, or may be located separate from the item 68, so long as one or more of such other components are communicatively coupled to the antenna array 52, as discussed above with regard to FIG. 9.

One or more of the electronic components 70 emit RF energy when powered. The antenna elements 66 over such electronic components 70 receive a different amount, and possibly a different frequency, of RF emissions than antenna elements 66 that are not over electronic components 70. Moreover, each component 70 may emit a different amount and/or frequency of RF energy. For example, the antenna elements 66-1A-66-1D which are positioned over the component 70-2 receive different amounts of RF emissions than the antenna elements 66-2. The amounts and/or frequencies of RF emissions received can be quantified, in terms of voltage and/or current, or frequency, for example, and used to generate an ad hoc RF emission signature. If one antenna element 66, such as the antenna element 66-1D, stopped operating, an ad hoc RF emission signature generated by the controller 54 will then differ from the predetermined RF emission signature 62 because the readout of the antenna element 66-1D would differ from when the antenna element 66-1D was operating properly. Such differences may result in an unsuccessful verification status, followed by a suitable verification action by the controller 54, such as the halting of the operation of the item 68.

Figure 11:
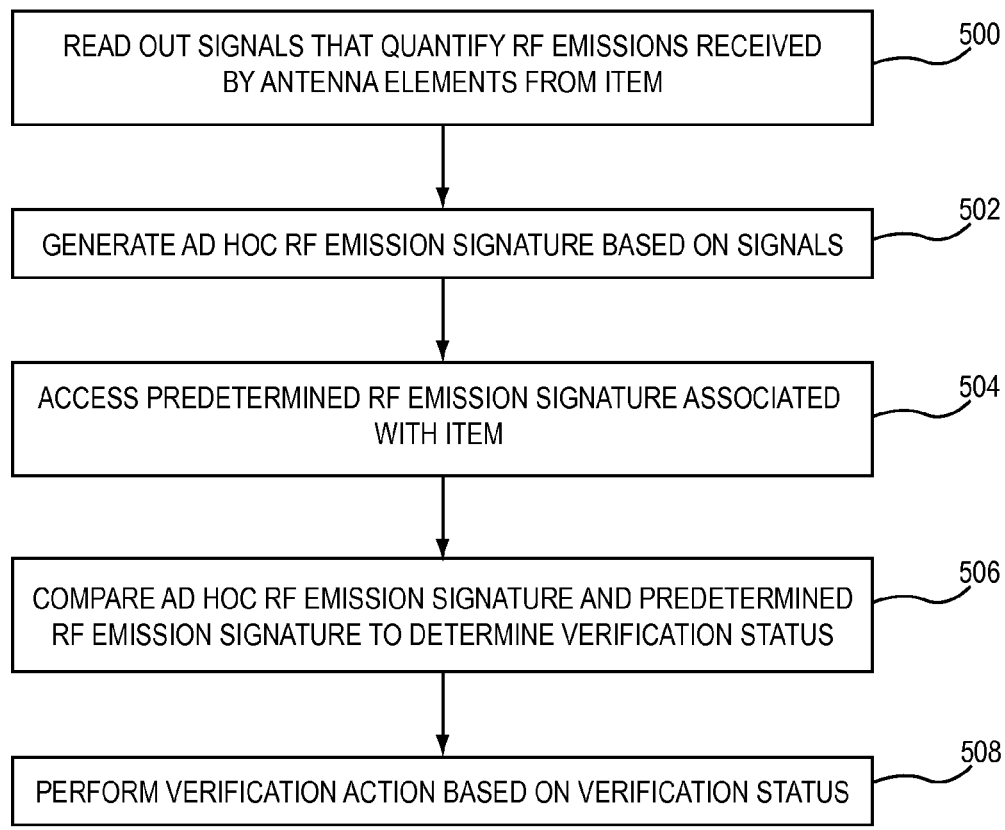
FIG. 11 is a block diagram of a flowchart for verifying an item according to another embodiment.

FIG. 11 is a block diagram of a flowchart for verifying an action according to one embodiment. FIG. 11 will be discussed in conjunction with FIGS. 9 and 10. Assume that the controller 54 has already generated and stored the predetermined RF emission signature 62 in the storage 60. Assume further that the item 68 is thereafter powered on. The controller 54, during an initialization of the item 68, such as during a boot up sequence of the item 68 for example, reads out, via the readout circuitry 64, signals from the antenna elements 66 of the antenna array 52 that quantify RF emissions received by the in the antenna elements 66 from the item 68 (FIG. 11, block 500). The controller 54 generates an ad hoc RF emission signature based on the signals (FIG. 11, block 502). The controller 54 accesses the predetermined RF emission signature 62 associated with the item 68 (FIG. 11, block 504). The controller 54 then compares the ad hoc RF emission signature to the predetermined RF emission signature 62 to determine a verification status (FIG. 11, block 506). The controller 54 may then perform a verification action based on the verification status (FIG. 11, block 508).

Figure 12:
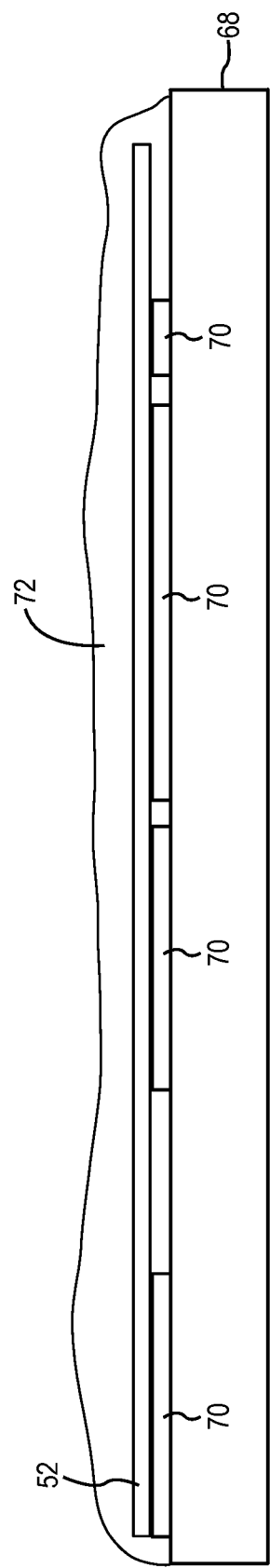
FIG. 12 is a block diagram of a side view of the item overlayed by the antenna array according to another embodiment.

FIG. 12 is a block diagram of a side view of the item 68 overlayed by the antenna array 52 according to one embodiment. In this embodiment, the antenna array 52 is embedded in a conformal coating 72 that adheres to the item 68. In one embodiment, the antenna array 52 may be placed on top of the item 68, and then the conformal coating 72 may be applied over the antenna array 52 and the item 68. In another embodiment, a first layer of the conformal coating 72 may be applied to the item 68, the antenna array 52 may then be positioned on top of the first layer of the conformal coating 72 before the first layer of the conformal coating 72 dries, and then one or more second layers of conformal coating 72 may be applied on top of the antenna array 52. The antenna array 52 may also include one or more openings to allow the first layer of the conformal coating 72 to directly adhere to the second layer of the conformal coating 72. The antenna array 52 may be relatively thin, and flexible, and thus may substantially conform to the components 70 of the item 68, even in situations where the components 70 have different heights.

Figure 13:
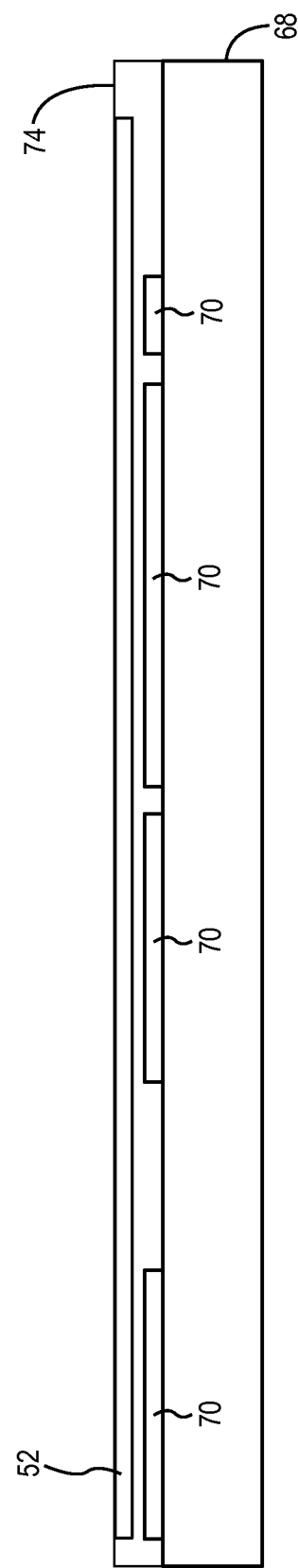
FIG. 13 is a block diagram of a side view of the item overlayed by the antenna array according to yet another embodiment.

FIG. 13 is a block diagram of a side view of the item 68 overlayed by the antenna array 52 according to another embodiment. In this embodiment, the item 68 is covered by a cover 74, and the antenna array 52 is adhered to an underside of the cover 74, such that the antenna array 52 is maintained in relatively close proximity to the components 70.

In some embodiments, the antenna array 52 may be covered by a ground plane or electromagnetic interference shielding so that emissions from other RF-emitting devices in proximity to the item 68 are blocked. The ground plane may comprise, by way of non-limiting example, a metal grid, a foil, or a metallic paint. The ground plane may be a floating ground plane or may be electrically coupled to a ground point. In one embodiment, the ground plane may be conformable to the item 68. In another embodiment, the ground plane may be integral with the cover 74.

Those skilled in the art will recognize improvements and modifications to the preferred embodiments of the present disclosure. All such improvements and modifications are considered within the scope of the concepts disclosed herein and the claims that follow.

What is claimed is:

1. A method for verification of an item, comprising:
    reading out, by a controller comprising a processor from an antenna array comprising a plurality of individual antenna elements that is configured to overlay an item that generates radio frequency (RF) emissions, signals that quantify the RF emissions received by antenna elements from the item;
    generating an ad hoc RF emission signature based on the signals;
    accessing a predetermined RF emission signature associated with the item;
    comparing the ad hoc RF emission signature and the predetermined RF emission signature to determine a verification status; and
    performing a verification action based on the verification status.

2. The method of claim 1, wherein the signals are in terms of one of a voltage and a current.

3. The method of claim 1, wherein the antenna array is embedded in a conformal coating that is adhered to the item.

4. The method of claim 1, wherein the antenna array is attached to a cover that is configured to cover the item.

5. The method of claim 1, wherein the item is a printed circuit board.

6. The method of claim 1, wherein performing the verification action comprises providing an output signal that indicates successful verification.

7. The method of claim 1, wherein performing the verification action comprises providing an output signal that indicates an unsuccessful verification.

8. The method of claim 1, wherein performing the verification action comprises halting subsequent execution of the item.

9. The method of claim 1, wherein the predetermined RF emission signature comprises a plurality of antenna element values, each antenna element value corresponding to one of the antenna elements, and quantifying an expected RF emission.

10. The method of claim 9, wherein comparing the ad hoc RF emission signature and the predetermined RF emission signature to determine the verification status further comprises:
    comparing signals read out from the antenna array to corresponding antenna element values in the predetermined RF emission signature; and
    determining that the verification status comprises a successful verification status if each signal matches the corresponding antenna element value.

11. A system comprising:
    an antenna array comprising a plurality of individual antenna elements that is configured to overlay an item that generates RF emissions; and
    a controller comprising a processor coupled to the antenna array and configured to:
        read out signals that quantify the RF emissions received by the antenna elements from the item;
        generate an ad hoc RF emission signature based on the signals;
        access a predetermined RF emission signature associated with the item;
        compare the ad hoc RF emission signature and the predetermined RF emission signature to determine a verification status; and
        perform a verification action based on the verification status.

12. The system of claim 11, further comprising a conformal coating, wherein the antenna array is embeddable in the conformal coating.

13. The system of claim 11, wherein to perform the verification action, the controller is configured to provide an output signal that indicates successful verification.

14. The system of claim 11, wherein to perform the verification action, the controller is configured to provide an output signal that indicates an unsuccessful verification.

15. The system of claim 11, wherein to perform the verification action, the controller is configured to halt subsequent execution of the item.

16. The system of claim 11, wherein the predetermined RF emission signature comprises a plurality of antenna element values, each antenna element value corresponding to one of the antenna elements, and quantifying an expected RF emission.

17. The system of claim 16, wherein to compare the ad hoc RF emission signature and the predetermined RF emission signature to determine the verification status the controller is configured to:
- compare signals read out from the antenna array to corresponding antenna element values in the predetermined RF emission signature; and
- determine that the verification status comprises a successful verification status if each signal matches the corresponding antenna element value.

18. A system comprising:
- an item that generates RF emissions;
- an antenna array comprising a plurality of individual antenna elements that is configured to overlay the item;
- a controller comprising a processor coupled to the antenna array and configured to:
  - read out signals that quantify the RF emissions received by antenna elements from the item;
  - generate an ad hoc RF emission signature based on the signals;
  - access a predetermined RF emission signature associated with the item;
  - compare the ad hoc RF emission signature and the predetermined RF emission signature to determine a verification status; and
  - perform a verification action based on the verification status.

19. The system of claim 18, wherein to perform the verification action, the controller is configured to halt subsequent execution of the item.

20. The system of claim 19, wherein the predetermined RF emission signature comprises a plurality of antenna element values, each antenna element value corresponding to one of the antenna elements, and quantifying an expected RF emission.

* * * * *